Jan. 27, 1948.   W. V. BARSH   2,435,066
METER READING ANNUNCIATOR
Filed Feb. 3, 1944   6 Sheets-Sheet 1

INVENTOR.
Walter V. Barsh
BY
Victor J. Evans & Co.
ATTORNEYS

Jan. 27, 1948. W. V. BARSH 2,435,066
METER READING ANNUNCIATOR
Filed Feb. 3, 1944 6 Sheets-Sheet 2

INVENTOR.
Walter V. Barsh
BY
Victor J. Evans & Co.
ATTORNEYS

Jan. 27, 1948.         W. V. BARSH                2,435,066
                METER READING ANNUNCIATOR
              Filed Feb. 3, 1944        6 Sheets-Sheet 3

INVENTOR.
Walter V. Barsh
BY
Victor J. Evans & Co.
ATTORNEYS

Jan. 27, 1948.　　　W. V. BARSH　　　2,435,066
METER READING ANNUNCIATOR
Filed Feb. 3, 1944　　　6 Sheets-Sheet 4

INVENTOR.
Walter V. Barsh
BY
Victor J. Evans & Co.
ATTORNEYS

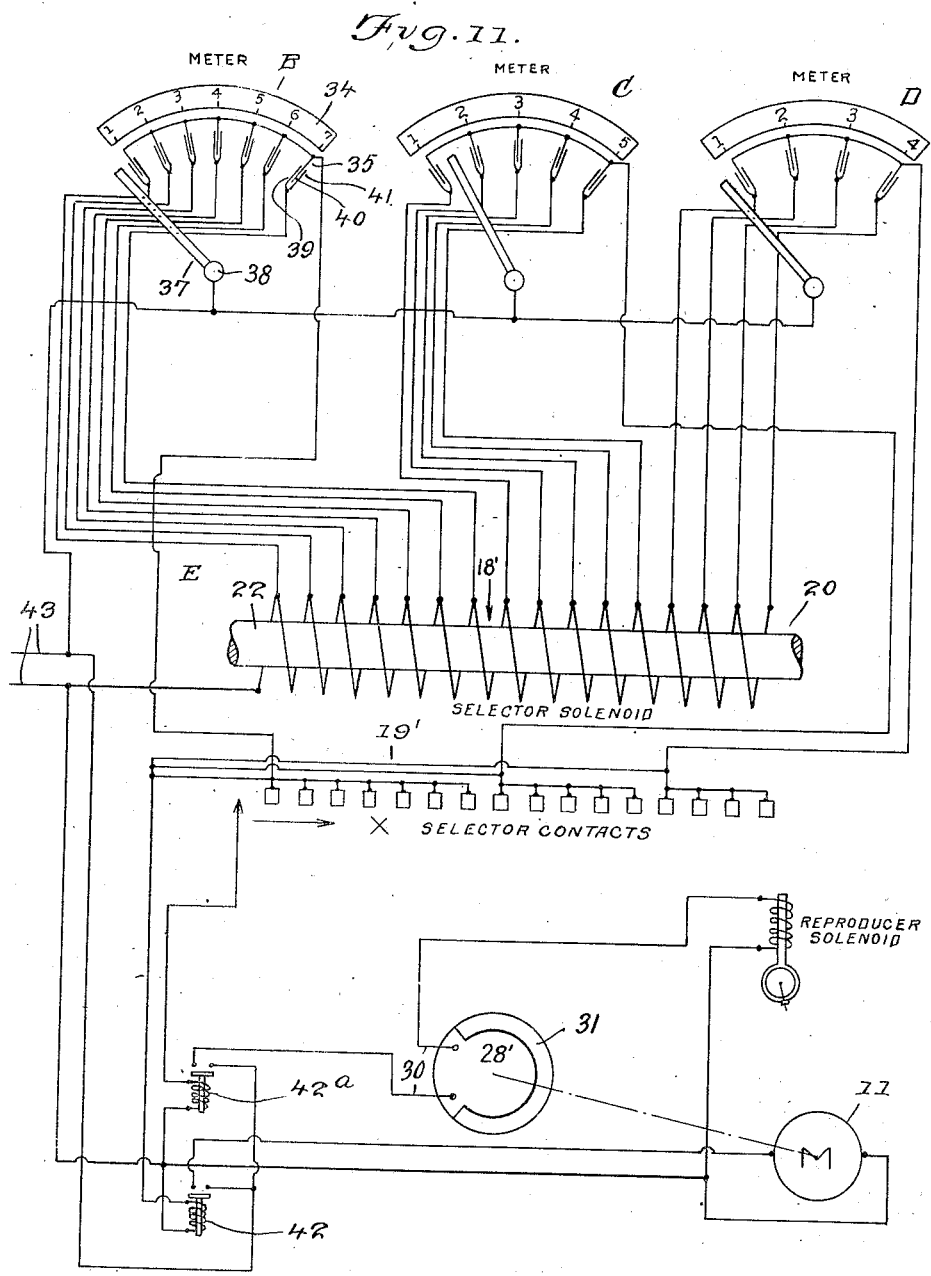

Jan. 27, 1948.  W. V. BARSH  2,435,066
METER READING ANNUNCIATOR
Filed Feb. 3, 1944  6 Sheets-Sheet 6
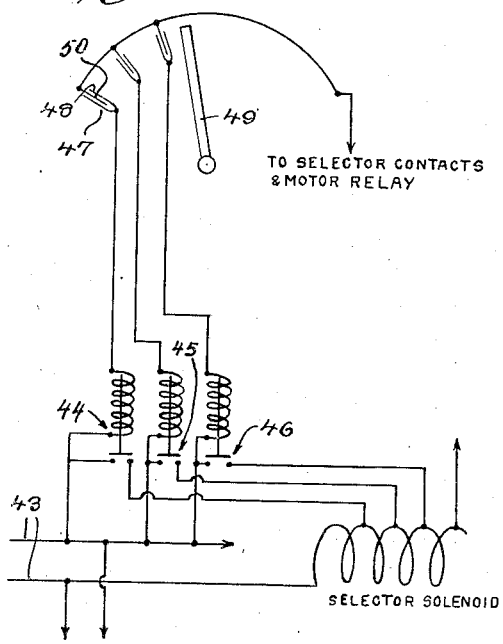
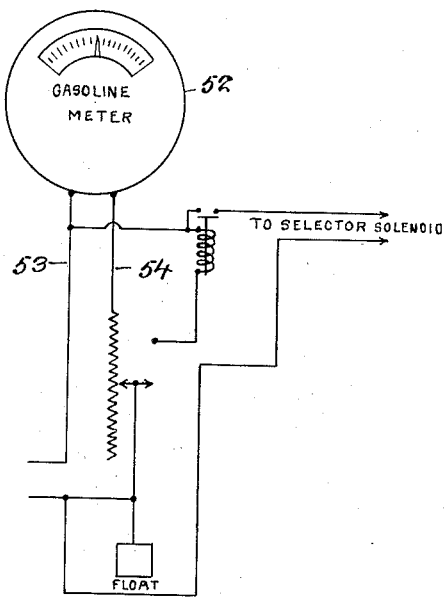
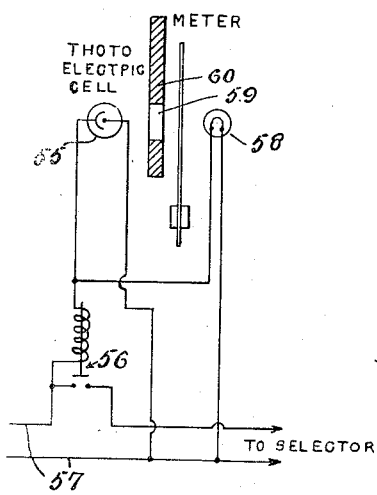
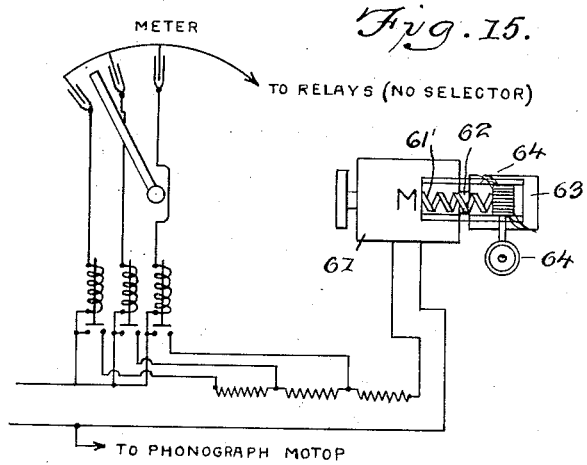
INVENTOR.
Walter V. Barsh
BY
Victor J. Evans & Co.
ATTORNEYS Patented Jan. 27, 1948

2,435,066

UNITED STATES PATENT OFFICE 2,435,066

METER READING ANNUNCIATOR

Walter V. Barsh, Indiantown Gap, Pa., assignor to Francis A. Barr, Laurelton, Long Island, N. Y.

Application February 3, 1944, Serial No. 520,947

1 Claim. (Cl. 177—311)

The invention relates to an annunciator, and more especially to an electro-mechanical reading annunciator.

The primary object of the invention is the provision of an annunciator of this character, wherein values, especially critical values, from indicating instruments, meters or other similar type devices are automatically translated into spoken words or oral messages.

Another object of the invention is the provision of an annunciator of this character, wherein warnings are announced to a person as to dangers or other conditions existing at the time, such as: speed of the vehicle in which he is traveling, the maximum temperature at which the vehicle will operate efficiently, the quantity of gasoline in the storage tank of the vehicle, and the time a change in oil for the motor is due, all without relying upon visible instruments for such purposes. In other words a person can be informed of all these conditions by oral means and without using the eyes, such conditions being ordinarily indicated by various readings on indicating devices, such as in the case of weighing scales, elevators, floor indicators, a burglar alarm or photo-electric "watch dog" and various other types of indicating mechanisms. Such type of annunciator is usable in planes and ships, in lieu of power plant instruments and other devices.

A further object of the invention is the provision of an annunciator of this character, which is comparatively simple in construction, thoroughly reliable and efficient in operation, unique in character, novel in its construction, positive of action, requiring little or no attention for the working thereof, durable, and inexpensive to manufacture and install.

With these and other objects in view, the invention consists in the features of construction, combination and arrangement of parts as will be hereinafter more fully described and illustrated in the accompanying drawings, which disclose the preferred embodiment of the invention, and defined in the claim hereunto appended.

In the accompanying drawings:

Figure 11 is a diagrammatic layout of the circuit arrangement between the annunciator and a plurality of indicators.

Figure 12 illustrates a modification of a portion of the electrical circuit of Figure 11 in which relays are interposed in the electrical circuits to avoid the need for high current values through the indicating device.

Figure 1:
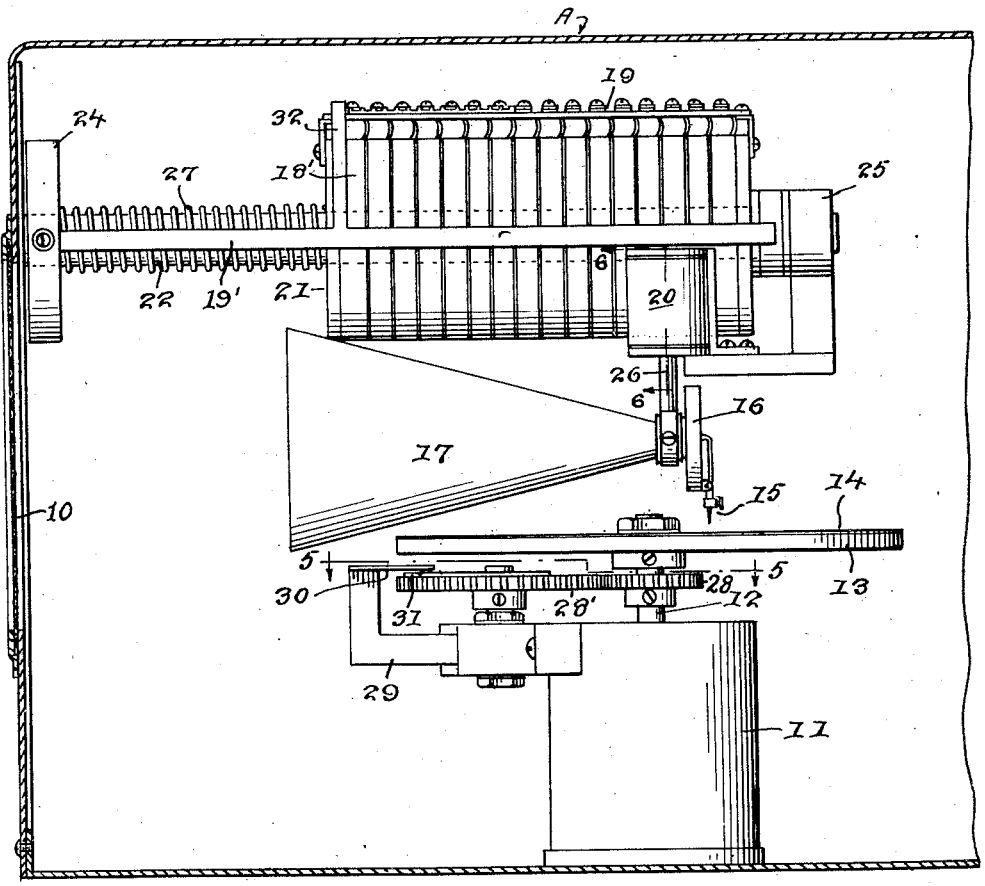
Figure 1 is a vertical sectional view through the annunciator casing showing the major portion of the annunciator mechanism in side elevation.
Figure 5:
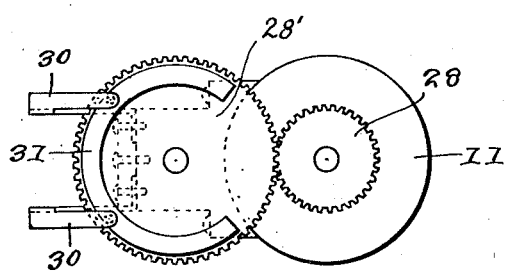
Figure 5 is a fragmentary sectional view taken approximately on the line 5—5 of Figure 1 looking in the direction of the arrows.
Figure 2:
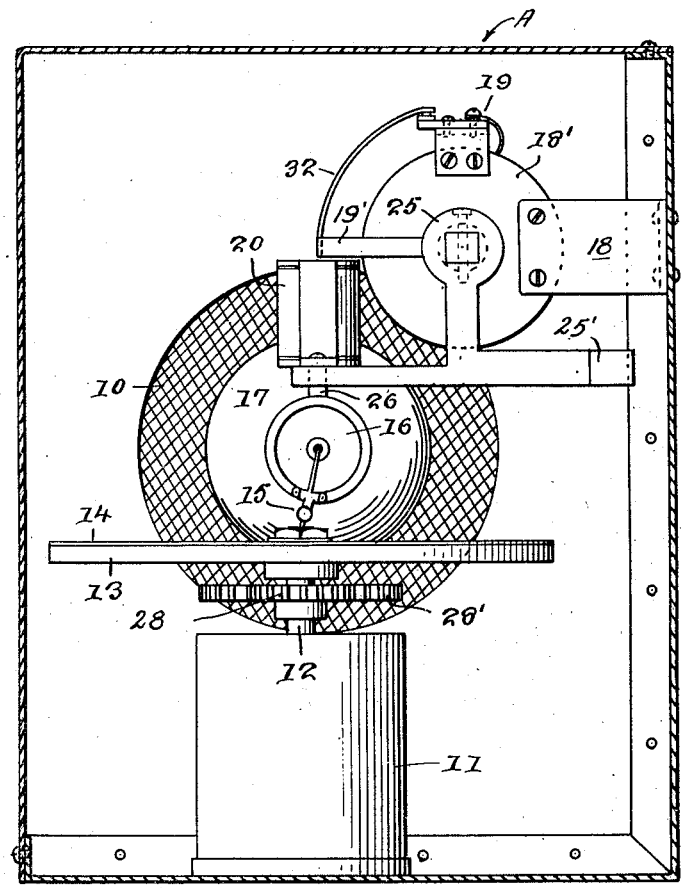
Figure 2 is a vertical sectional view through the casing similar to Figure 1, but looking toward the front.
Figure 6:
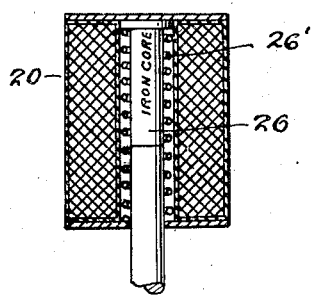
Figure 6 is a fragmentary vertical sectional view taken through 6—6 of Figure 1.

Figure 13 schematically shows an alternative method for connecting an indicating device such as a gasoline gage or meter.

Figure 14 schematically illustrates the use of a photo-electric cell with instruments in which frictional contacts between moving parts are avoided.

Figure 15 is a schematic view similar to Figure 12, but showing an electric motor in lieu of the solenoid.

Similar reference characters indicate corresponding parts throughout the several views in the drawings.

Referring to the drawings in detail, in this instance, Figures 1 to 11, inclusive, A designates generally a portion of a box-like casing having at one end thereof a screened window 10 through which pass sounds generated within the casing in a manner to be described. Suitably supported interiorly of the casing upon its base is an electric motor 11 having a vertically disposed driving shaft 12 carrying a turn-table 13 of a phonograph machine for a disk-record 14, which is mounted upon this table. The record 14 is screwed onto the table 13 and has a plurality of concentric grooves or sound-tracks each of which is impressed with a message relating to a definite reading on a meter in a manner hereinafter set forth.

The concentric sound grooves or tracks in the record 14 are adapted to be selectively engaged by a phonograph stylus 15 coacting with a diaphragm 16 for converting the impressions of the sound grooves or tracks into sound for reproduction through a megaphone or speaker horn 17 in a manner well known to the art.

Suitably supported in the casing above the phonograph machine by a hanger 18 is a flanged spool 21 about which is a solenoid coil 18', a terminal panel 19, and a pick-up solenoid 20, respectively. The solenoid coil 18' surrounds the spool 21, the flanges of which are fastened to the hanger 18, while the terminal panel 19 is secured to the flanges of the spool 21. A core or plunger 22 extends entirely through the center of the spool 21 and is preferably made in three parts: a center or magnetic section 23 being the armature and non-magnetic sections at opposite sides of the magnetic part 23. This plunger 22 has fitted to opposite ends thereof arms 24 and 25, respectively. The arm 25 carries the pick-up solenoid 20, the weight of which is counterbalanced by the enlarged extension 25' formed on the arm 25. The armature 26 of the solenoid 20 carries the reproducer of the phonograph machine. When the solenoid 20 is energized it drops the stylus 15 upon the record 14 against the action of the return spring 26' (see Figure 6). Upon de-energization of the solenoid 20 the reproducer is withdrawn from the record 14 by the return spring 26'.

Figure 4:
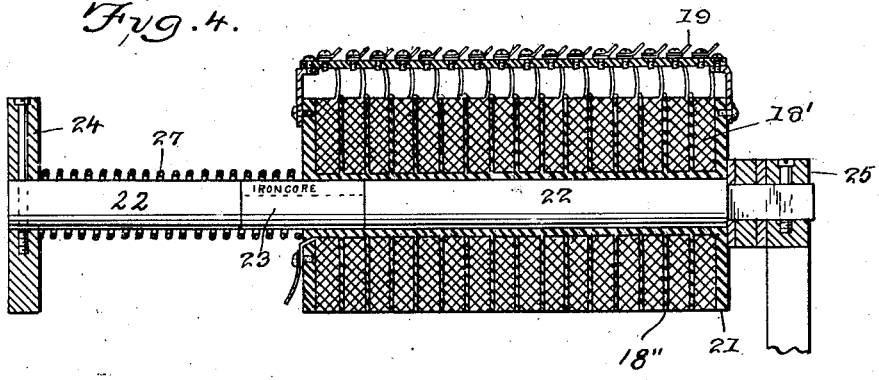
Figure 4 is a fragmentary vertical sectional view taken on the line 4—4 of Figure 3.
Figure 7:
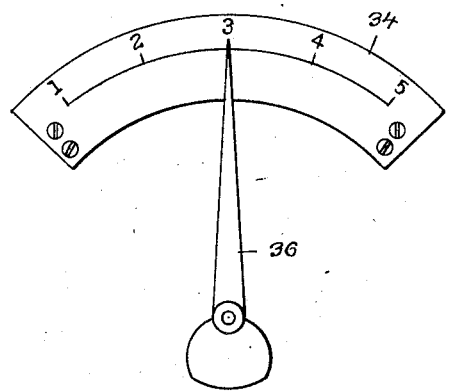
Figure 7 is an elevation of an indicator employed with the annunciator.

The plunger 22 is biased by a concentric tension spring 27, between a flange of the spool 21 and the arm 24, toward the grille 10. The solenoid coil 18', as shown in Figure 4, formed from a plurality of sections electrically connected in series but mechanically separated from each other by spacers 18". Each section has the same number of turns of wire and its position corresponds to a definite sound groove or track on the record 14.

The shaft 12 of the motor 11 has fixed thereto one of a train of timer gears 28, the other gear 28' of which is journaled on a bracket 29 of insulating material attached to the motor 11. This bracket of insulating material supports timer contacts 30, two in number, spaced from each other and raised out of contact with the gear 28' but which are adapted to contact a metal timer strip 31, mounted on gear 28' as it is rotated by the pinion 28.

Figure 3:
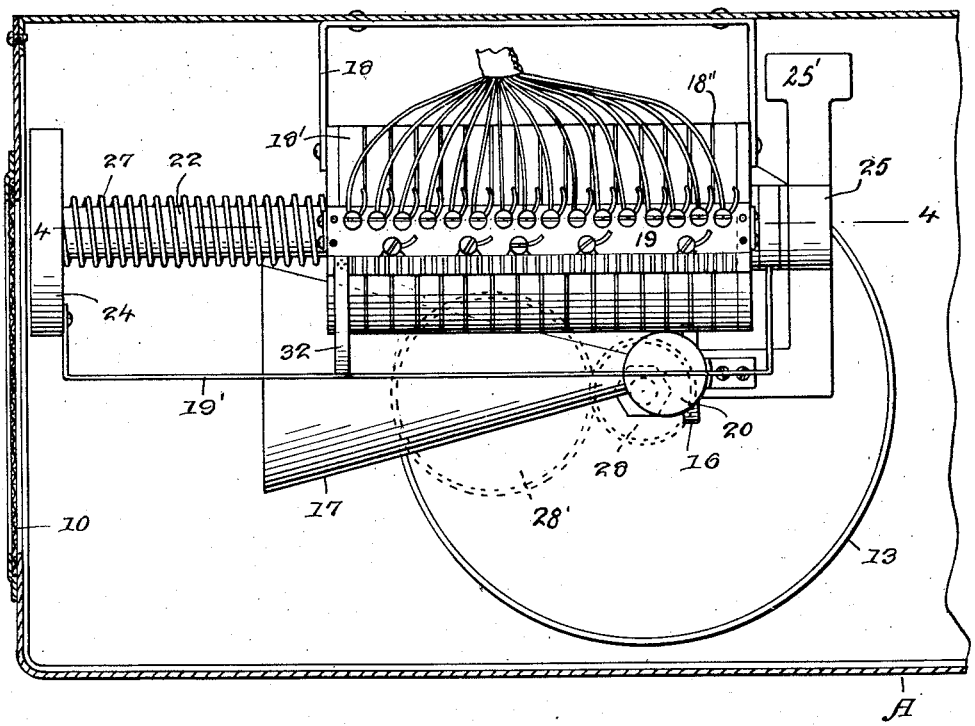
Figure 3 is a plan view of the annunciator mechanism of Figure 1.

The terminal panel 19 is made from a strip of metal, preferably copper with prongs, spaced at equal distances, and equal to the distance to be advanced by the plunger 22 for corresponding readings upon a meter dial. A contact arm 32, mounted on selector 19' which is secured to the ends of the plunger 22 as shown in Figure 3, slides over these prongs to make contact as the plunger 22 advances or recedes. The terminal panel 19 holds all incoming connections from the dial of a meter and distributes them to the correct positions on the solenoid coil 18'.

Figure 8:
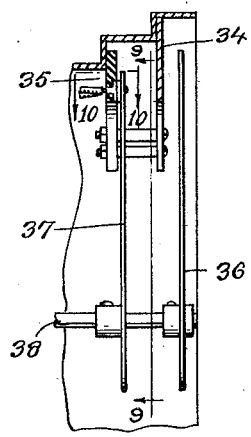
Figure 8 is a vertical section through the indicator of Figure 7.
Figure 9:
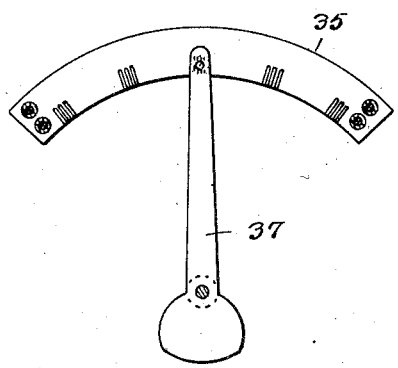
Figure 9 is a sectional view through 9—9 of Figure 8.
Figure 10:
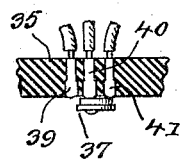
Figure 10 is a fragmentary horizontal section through line 10—10 of Figure 8.

In Figure 11 of the drawings there is shown diagrammatically three meters, B, C and D, respectively, each including spaced outer and inner plates 34 and 35, which as shown in Figure 8, are in association with double arms 36 and 37, respectively, mounted upon turning arbor 38 common thereto. The arm 36 is a pointer for identifying calibrations or identification data upon the exposed face of the dial plate 34, while the arm 37 is adapted to engage two contacts of a group of three contacts 39, 40 and 41, respectively, of a series of groups mounted on the plate 35, that is to say, such engagement is with contacts 39 and 40 or 40 and 41, according to the direction of travel of the arm in the working of the meter.

The electric current layout for the carrying parts of the structure hereinbefore described is generally denoted at E. In tracing the operation of one of the meters, for example meter B, when the arm 37 makes contact with either contact 39 or 41, current passes from the said arm 37 to the coil 18' moving solenoid plunger 22, which carries the pick-up mechanism, forward and to the predetermined sound groove in the record 14 corresponding to the definite meter reading. As the arm 37 advance to bridge contacts 39 and 40, the current passes to the selector 19' and to a relay 42 for energizing the phonograph machine motor. The current from the selector 19' passes to relay 42a which does not energize the solenoid 20 to drop the reproducer stylus 15 until the contacts 30 are bridged by the strip 31 which has been rotated through gears 28' and 28 driven by motor 11. As soon as the contacts 30 are bridged, the stylus 15 is placed on the record 14 to pick up the words telling what the reading on the meter is. This repeats about three times, at which time the strip 31 is moved from underneath contacts 30, breaking the circuit through the relay 42a and solenoid 20 whereupon the spring 26', see Figure 6, lifts the pick-up unit. As the arm 37 advances slightly more to bridge contacts 40 and 41, the same effect will be had as when the contacts 39 and 40 are covered by the arm 37. When the arm 37 leaves contact 40 and rests on 41 the pick-up unit is deenergized and raised by the spring 26' because of the circuit being broken to release relay 42a and the phonograph motor 11 comes to a standstill, but the solenoid coil 18' remains energized holding the pick-up unit above the record 14. When the arm 37 leaves the contact 41 the solenoid coil 18' is de-energized and the plunger 22 returns to its original position by the spring 27 and a reading of a value on the meter B has been accomplished. The electric power feed line is denoted at 43 in the drawings, for the current arrangement disclosed in Figure 11 thereof.

In Figure 12 of the drawings there is shown a slight change in the diagram shown by Figure 11, in that this circuit contains relays 44, 45 and 46, one for every reading required of a meter. The reason for this type of circuit is that it can be used where much pressure between contacts cannot be obtained, such as in electrical instruments. Thus for small contact currents the relays are actuated, and more current is made to pass through the closed circuit because of the relay action. The contacts 47 and 48 are connected to the selector solenoid, while the contacts 50 and arm 49 are connected to selector and motor relay, respectively.

In Figure 13 of the drawings there is shown a hook-up of an electric meter 52 in an automobile, indicating the amount in gallons of gasoline held in the tank therefor. In this instance, not only connections need to be made in the back of the dial of such meter 52, but can also be made at the most convenient and economical place, for example, directly to the resistances of the meter, where a contact or contacts may be placed the same as in the rear of meters B, C or D, shown in Figure 11, and necessary connections 53 and 54, respectively, of the circuit disclosed by said Figure 11.

In Figure 14 of the drawings there is shown another type of hook-up, wherein the circuit includes a selenium cell 55, or a photo-electric cell connected to a relay 56 and across the supply line 57. This form of circuit is employed where friction contacts cannot be made, as in delicate instruments. A light bulb 58 connected to the supply line sheds a faint beam of light through a hole 59 in the dial 60 above the reading of the meter, on to a selenium or photo-electric cell 55 causing current to pass through the relay, thus actuating the same which closes the circuit to the solenoid and motor or in the case where only one reading is to be taken by annunciator, the connections being made directly to the relays of the pick-up unit and the phonograph motor. This circuit can be made up the same as circuits in Figure 12 by adding relays to obtain more readings.

In Figure 15 of the drawings, this diagram therein shows an electric motor 61 which can be used instead of a solenoid for moving the pick-up unit over the record 14. The motor shaft 62 has a cam 63 provided with a spiral groove 64 therein and a pin on the reproducer 64 travels therein so that the latter moves forward over a record 14. When the current is off the springs 61' rotate the armature of the motor 61 to its original position of the solenoid of the pick-up unit, thus as the cam 63 rotates the pin follows the groove of the cam and the springs 61' pull the reproducer 64 to its original position as the motor or cam comes to a stop. The cam moves the pick-up unit over the record 14 hereinbefore described.

The operation is as follows:

When the pointer of meter B first makes contact with either contact 39 or 41, current will pass from the pointer 36 through 39 or 41 to the solenoid coil, causing the solenoid plunger 22 to move inwardly carrying the pick-up mechanism 20, 26, 16 and 15 forwardly and directly over the phonograph record and to the predetermined groove in the record corresponding to a definite meter reading. As the meter pointer 36 further moves slightly, it will also contact 40, causing current to pass to the selector contacts, from there to the relay which starts the phonograph motor to revolve. The current from selector 19' passes to relay 42a which does not set the pick-up solenoid into action until a number of revolutions are made by the phonograph motor, controlled by the timer. As soon as the timer makes contact, the diaphragm, together with the stylus, are placed on the revolving record, and words are picked up telling what the reading on the meter is. This repeats about three times, and then the timer cuts off the relay from the pick-up unit and no more transmitting of sound is made until the timer again throws in the relay of the pick-up unit. As the pointer advances slightly more to make contact with 39 or 41, the same effect will be produced as mentioned above. Since the pointer is just wide enough to cover two contacts such as 41 and 40, or 40 and 39, but as soon as the pointer leaves 40, and rests on 39 or 41, the pick-up unit is raised first because of the quick acting quick release relay, later the phonograph motor comes to a stand still, but the solenoid coil 18' is energized and the pick-up unit is directly above the record. When the pointer leaves contact 39 or 41, the solenoid coil is de-energized and the plunger returns to its original position, due to the tension of plunger spring, and reading of value 1 on the meter has been accomplished. This principle of operation is the same for all other readings when the pointer of a meter is making its return to zero readings.

As an illustration of the operation of the annunciator it is assumed that the meter B is associated with the speedometer of a motor vehicle, the meter C with the oil gage, and the meter D with the gasoline tank. Each of the contacts of the meters is connected to a coil of the solenoid 18' as illustrated in the diagram in Figure 11 with the meters in sequence according to their value or importance. It obviously requires less pull to actuate the core 22 of the solenoid 18' to the first coil thereof which is energized from the first contact of the meter B than is required to pull the core to the coil to which the first contact of the meter D is connected. It is more important to announce that the gasoline supply is exhausted and, therefore, when the pointer of the meter D makes a contact the core is drawn away from the coils connected to the other meters, and only one contact to the announcer is completed. In order to prevent the needle or stylus of the pick-up being drawn across the record by the meter D the selector or terminal panel 19' is provided which breaks the circuit between each coil so that as soon as the pick-up starts to move it is raised. The timer contacts 30 also break the circuit to the pick-up solenoid 20 after each revolution of the record providing intermittent operation thereof.

What is claimed is:

In an annunciating machine, the combination of a condition manifesting arm, means movably mounting the same whereby movement of the same varies with the magnitude of the condition, a first series of spaced contacts mounted in the path of said arm and adapted to be slidably engaged thereby during movements thereof in accordance with the magnitude of the condition, each said contact representing a respective predetermined magnitude of the condition, a plurality of separate coils electrically connected together in series, frame means mounting said coils in axial alignment to form a solenoid, a plunger slidably mounted through said coils, spring means between said plunger and said solenoid for yieldingly resisting movement of the plunger into the solenoid, a turntable positioned beneath the plunger, an electric motor for rotating the turntable, a flat phonograph record mounted on said turntable and having a series of substantially concentric discrete sound grooves, each groove having a recording of a message by the human voice describing the magnitude of the condition represented by the respective contacts, a sound reproducing means above said phonograph record and attached to said plunger for movement therewith, means connecting said first series of contacts to said coils respectively for energizing a number of coils corresponding to the contact being engaged by the movable arm whereby said plunger will be shifted against the spring means into said solenoid a distance governed by the coils energized to thereby position the sound reproducing means above the concentric sound groove containing the recording describing the magnitude of the condition corresponding to the contact being engaged by the movable arm, a source of electrical energy connected across said arm and the end coil of the solenoid, a pick-up solenoid means carried by said sound reproducing means and adapted to control the engagement of the same with a sound groove on said phonograph record, a first relay means including timer contacts associated with said pick-up solenoid for controlling the conditioning of the same preparatory to engaging the phonograph record, a second relay means associated with said electric motor for controlling energization thereof, a circuit breaker device for bridging said timer contacts, gear means driven by said motor for actuating said circuit breaker device whereby energization and deenergization of said pick-up solenoid is synchronized with respectively the beginning and the ending of the message on the sound groove on phonograph record and corresponding to the condition indicated by the arm, a second contact mounted adjacent each first contact, means connecting said second contacts to one side of each of said relay means, means connecting a source of energy across said arm and the other side of each of said relays whereby upon a change in magnitude of the condition being manifested by movement of said arm, said sound reproducing means will reproduce a message of a human voice announcing such magnitude.

WALTER V. BARSH.

REFERENCES CITED

The following references are of record in the file of this patent:

UNITED STATES PATENTS

| Number | Name | Date |
|---|---|---|
| 623,637 | Thompson | Apr. 25, 1899 |
| 1,417,983 | Freeble | May 30, 1922 |
| 1,579,877 | McDonnell | Apr. 6, 1926 |
| 1,913,512 | Reynolds | June 13, 1933 |
| 2,362,918 | Miller | Nov. 14, 1944 |